United States Patent [19]

Uba et al.

[11] 4,346,151
[45] Aug. 24, 1982

[54] MULTICELL SEALED RECHARGEABLE BATTERY

[75] Inventors: Toshio Uba, Denver; Larry K. W. Ching, Littleton; Michael R. Harrison, Evergreen, all of Colo.

[73] Assignee: The Gates Rubber Company, Denver, Colo.

[21] Appl. No.: 221,227

[22] Filed: Dec. 29, 1980

[51] Int. Cl.³ .................................... H01M 10/12
[52] U.S. Cl. .................................. 429/54; 429/94; 429/99; 429/149; 429/160; 429/158
[58] Field of Search .............. 429/53, 54, 94, 156, 429/158, 160, 159, 163, 176, 177, 151, 65, 96, 99, 100, 149

[56] References Cited
U.S. PATENT DOCUMENTS

| | | | |
|---|---|---|---|
| 2,742,520 | 4/1956 | Pucker et al. | 429/160 |
| 2,836,642 | 5/1958 | Bauer | 429/118 |
| 3,178,317 | 4/1965 | Maddaloni | 429/99 |
| 3,219,485 | 11/1965 | Foecking et al. | 429/99 |
| 3,341,053 | 9/1967 | Keene | 429/97 X |
| 3,704,173 | 11/1972 | McClelland et al. | 429/181 X |
| 3,862,861 | 1/1975 | McClelland et al. | 429/57 |
| 4,121,017 | 10/1978 | Dougherty et al. | 429/177 X |
| 4,160,857 | 7/1979 | Nardella et al. | 429/97 |

Primary Examiner—Anthony Skapars
Attorney, Agent, or Firm—Curtis H. Castleman, Jr.; H. W. Oberg, Jr.; Raymond Fink

[57] ABSTRACT

A multicell sealed rechargeable battery is disclosed including an open mouth monobloc container formed of a plurality of cup-shaped cell holders interconnected at mutual tangent zones, electrochemical cells of the rechargeable type fitting into the cell holders and interconnected to form the battery, and a closure member attached to the mouth of the monobloc container.

12 Claims, 13 Drawing Figures

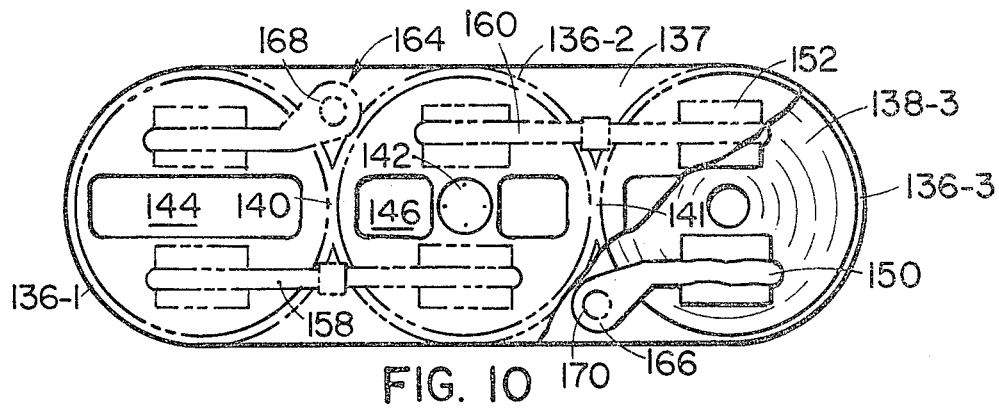
FIG. 10
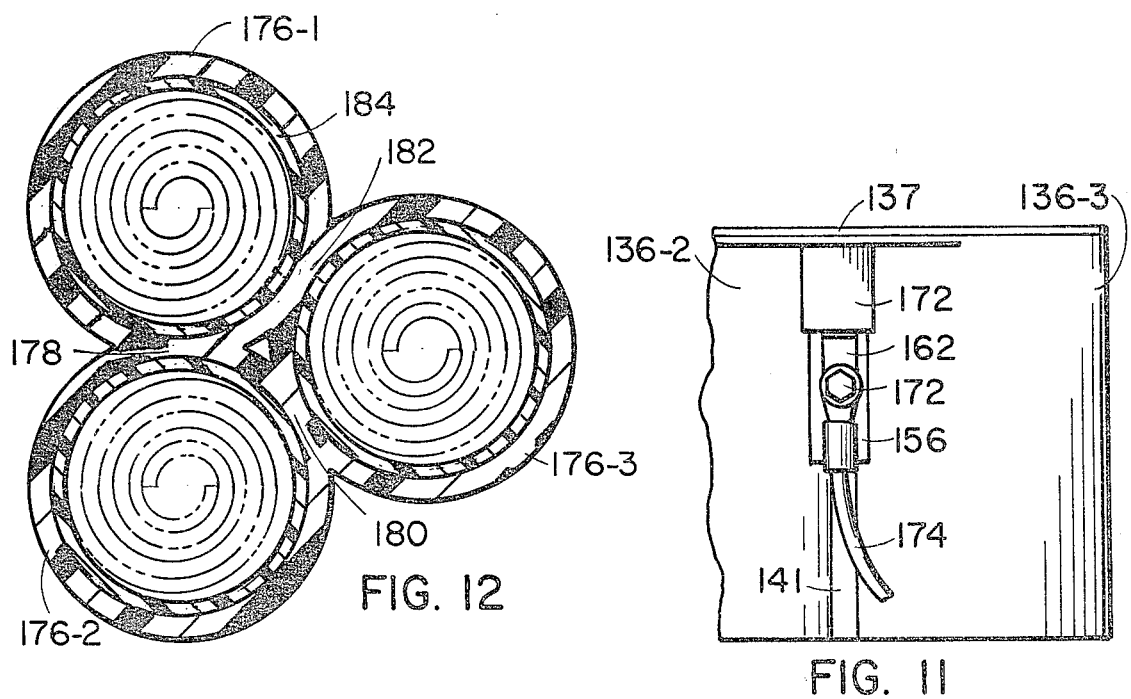
FIG. 12
FIG. 11
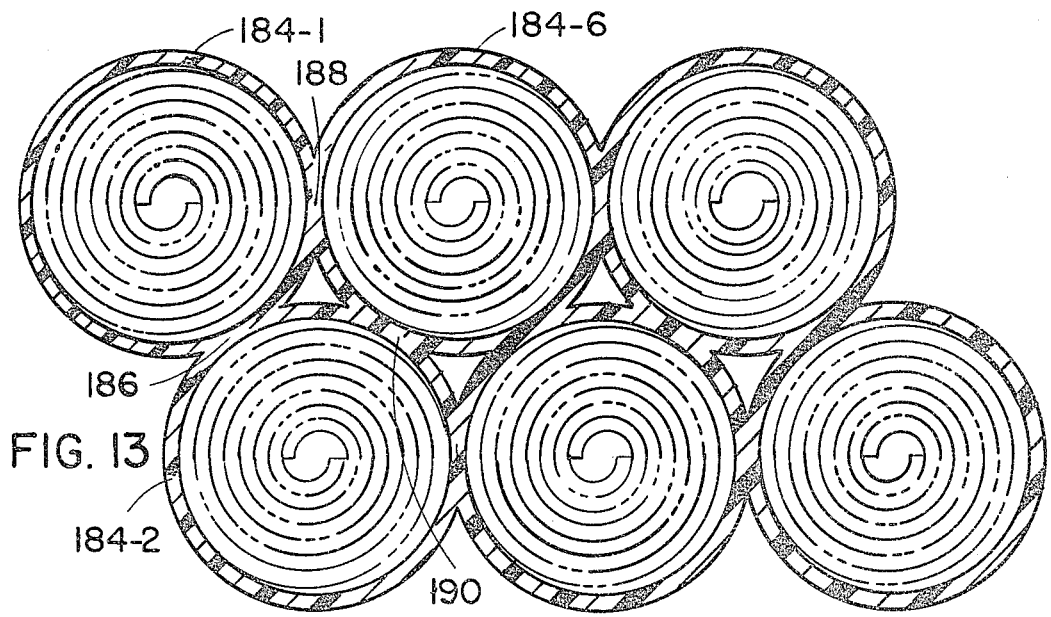
FIG. 13

MULTICELL SEALED RECHARGEABLE BATTERY

BACKGROUND OF THE INVENTION

This invention relates to sealed batteries employing a monobloc container for housing a plurality of substantially cylindrically shaped cells.

Various configuration containers are known for housing cylindrically shaped cells. Typically the cells are fitted into containers having an outer parallelepipedic shape, such as shown in U.S. Pat. No. 2,543,106 (Harriss) and U.S. Pat. No. 2,836,642 (Bauer). Battery housings of other shapes are exemplified by U.S. Pat. Nos. 4,160,857 (Nardella et al.) and 4,190,702 (Pun et al.).

It is a primary object of the present invention to provide a battery employing a housing which is lightweight, utilizes a minimum of material, resists impact, provides vibration resistance, and which may be formed of as few as two parts joined together. It is another object to provide such a housing and battery of the sealed rechargeable type employing wound cell elements for high discharge rate capability for engine starting, as well as other cyclic and float applications.

SUMMARY OF THE INVENTION

Briefly described, the invention comprehends a multicell sealed rechargeable battery and integral housing therefore, including: an open mouth substantially rigid monobloc container including a plurality of cup-shaped cell holders each interconnected to at least one adjacent cell holder at mutual circumferential tangent zone(s), to define common substantially nondeformable intercell partitions at such zones; electrochemical cells of substantially cylindrical shape fitting in said cell holders and interconnected to form a battery; and a closure member attached to the monobloc container at its mouth.

BRIEF DESCRIPTION OF THE DRAWINGS

The invention will be more particularly described in certain of its preferred embodiments in conjunction with the accompanying drawings, in which like numerals designate like parts, and in which:

FIG. 10 is a top plan view, partially cutaway of the battery configuration of FIG. 9;

FIG. 11 is a partial side elevational view taken along 11—11 of FIG. 9;

FIG. 12 is a view similar to FIG. 4 of an alternative battery configuration; and FIG. 13 is another sectional view similar to FIG. 4 of an alternative battery configuration of the invention.

PREFERRED EMBODIMENTS OF THE INVENTION

Figure 1:
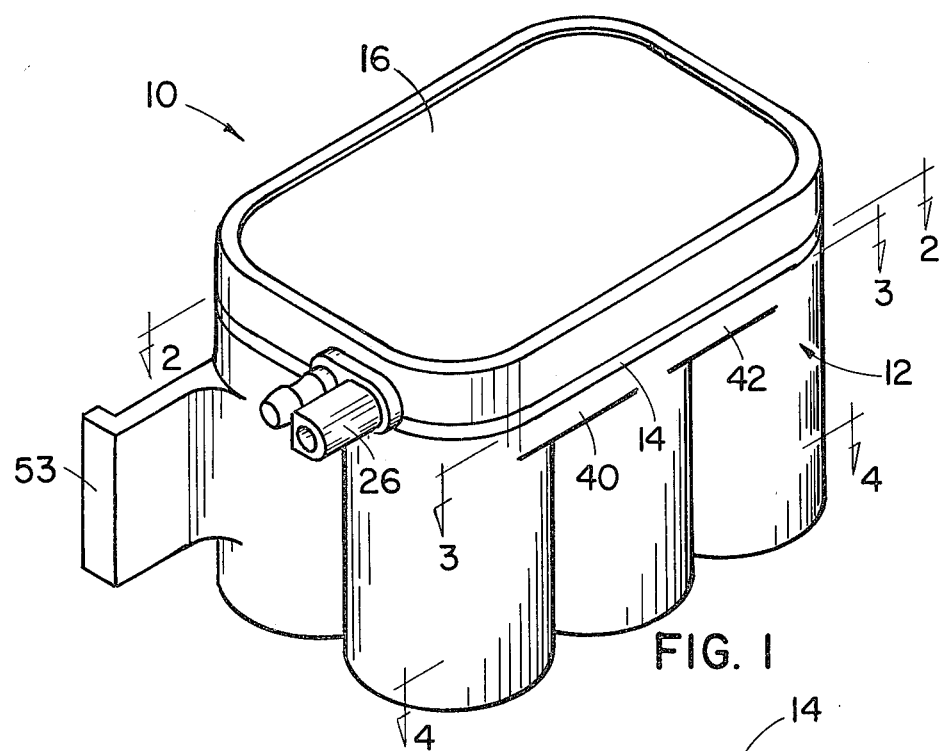
FIG. 1 is a perspective view of one battery configuration of the invention.
Figure 2:
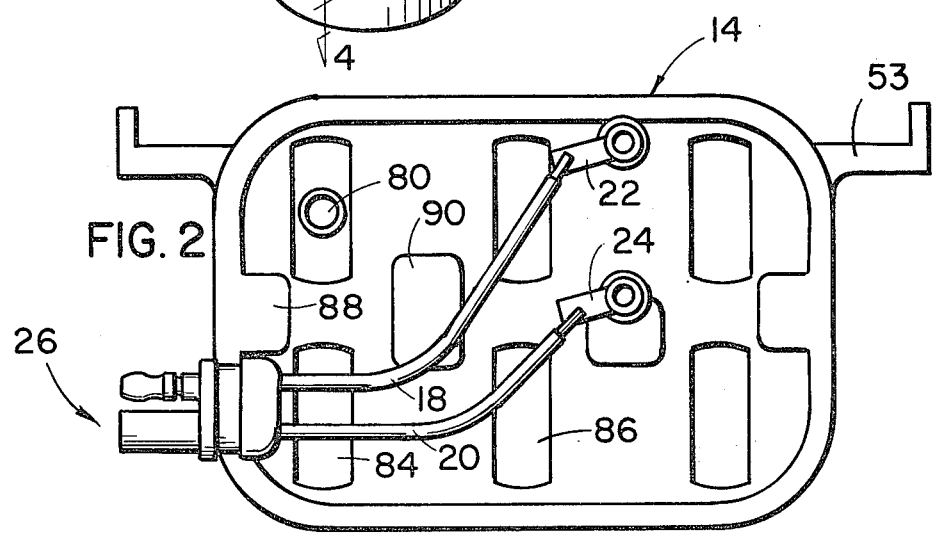
FIG. 2 is a plan view of the inner top taken along 2—2 of FIG. 1.
Figure 3:
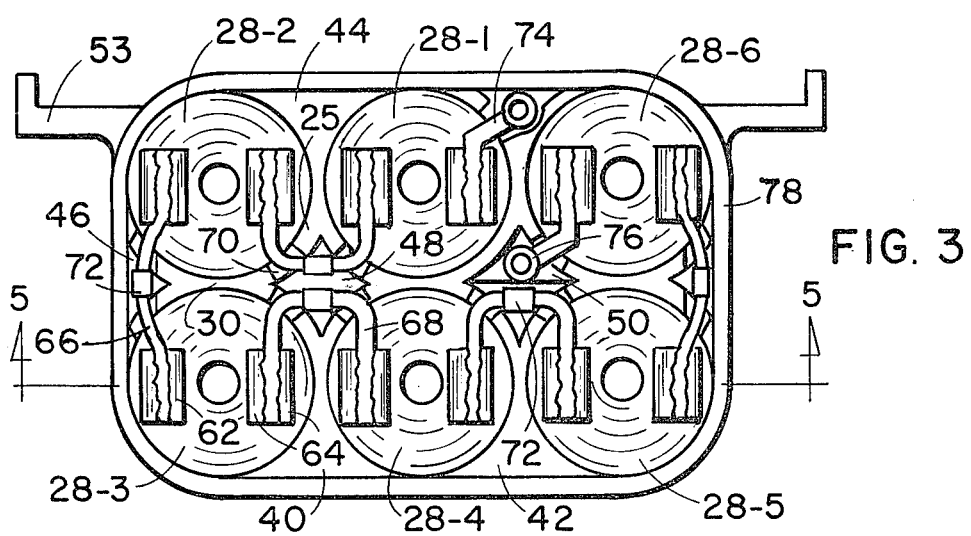
FIG. 3 is a plan view of the top of the cell elements of the battery of FIG. 1 taken along 3—3.

The battery configurations illustrated herein, while having a number of different applications are, by way of example, adapted to be employed as lawn mower starting batteries. In addition to engine start, the battery may provide power to brake the cutting elements of the lawn mower for safety purposes. In this application the battery is directly rechargeable from the lawn mower magneto.

Referring first to the embodiments of FIGS. 1-5, there is shown generally at 10 a two-by-three battery housed in a monobloc container 12, sealed inner lid 14, and an outer lid 16. Leads 18, 20 attached respectively to the opposite polarity terminals 22, 24 of the battery are brought through the outer top cover 16, terminating in a standard terminal connector 26.

Figure 4:
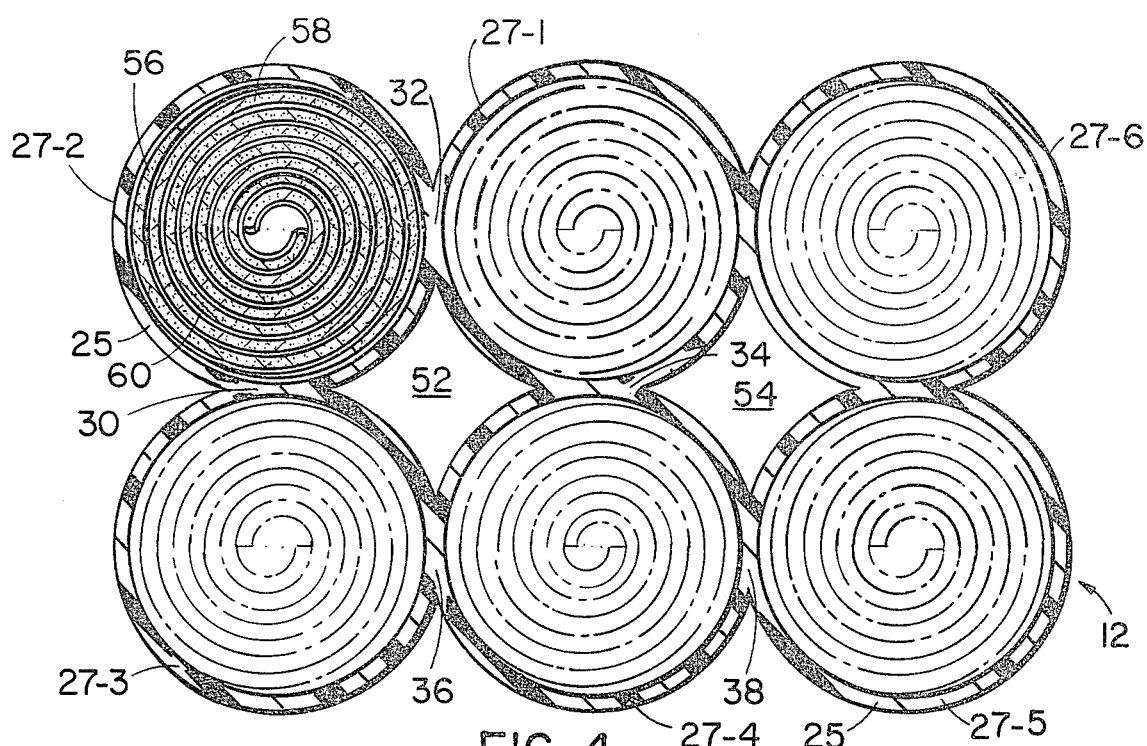
FIG. 4 is a sectional, partially schematic view taken along 4—4 of FIG. 1.
Figure 5:
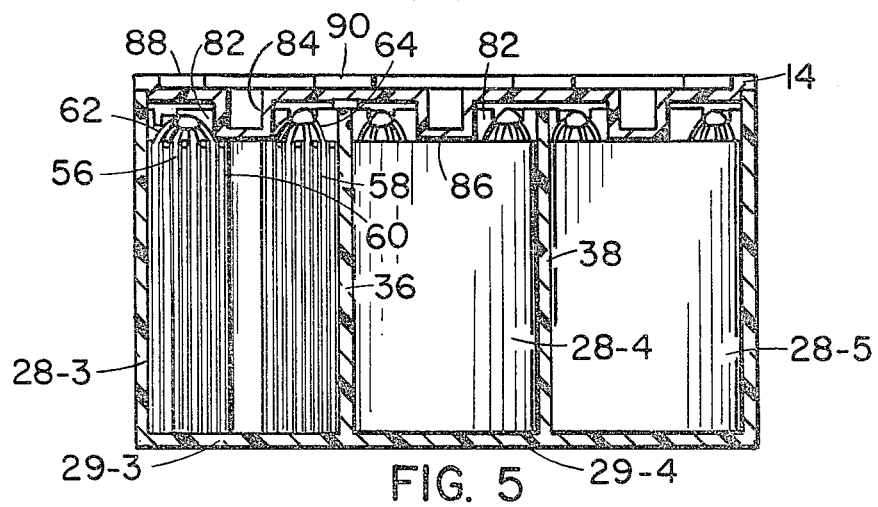
FIG. 5 is a vertical, partial sectional view taken along 5—5 of FIG. 3, omitting ears 53, but including lid 14.

Monobloc container 12 is formed of six cup-shaped cell holders 27-1, -2, -3, -4, -5 and -6 (FIG. 4) with preferably cylindrical walls 25, and which each have closed bottoms e.g., 29-3, 29-4 (FIG. 5). Each of the cell holders interconnect with at least one adjacent cell holder at mutual tangent zones, e.g., 30, 32, 34, 36, 38. The entire container 12 is formed of a substantially rigid material, preferably an electrical insulator, such as a molding of suitable plastic or the like. Useful materials include ABS, polypropylene, polystyrene, and polycarbonate and others which are stable in the electrolyte. The material may be reinforced with glass fibers or other strengthening material as needed. By virtue of the interconnections at the aforementioned tangent zones such as at 30 and 32, the overall container is given a high degree of strength and rigidity despite the use of a minimum amount of material. The cylindrical shape and rigidity of the cell holders provide them with the strength needed to withstand internal pressures generated within the cells, particularly during charging of the battery.

It is preferred that the wall gauge or thickness of each of the cell holders 27-1 . . . -6 is substantially equal throughout its circumference, although the container may be of somewhat greater or lesser thickness at the tangent zones. Because of the substantial rigidity of the monobloc container, the intercell partitions defined by the tangent zones 30, 32, etc., define intercell partitions which are substantially non-deformable so that the monobloc container does not distort with variations in internal pressure.

Preferably, at least one of the cell holders 27-1, . . . -6, makes mutual contact with at least two adjoining cell holders through the common partition walls. Most preferably, each cell holder including the end cell holders 27-2, 27-3, 27-5 and 27-6 makes contact with at least two adjoining cell holders at the common tangent zones.

Monobloc container 12 is further strengthened with rigidifying transverse webs, e.g., 40, 42, 44 and 46, together with internal webs 48, 50 which bridge the cavities 52, 54 near the mouth of the container.

Ears 53 or other means may also be provided to facilitate mounting the housing of the battery to the device being powered. The ears 53 may also be made with holes or the like to accept a mounting bolt if desired.

Into each of cell holders 27-1 . . . -6 is housed a substantially cylindrically shaped electrochemical cell 28-1, . . . -6. A snug fit is preferred. A preferred type of cell is the lead-acid gas recombining battery taught more fully in U.S. Pat. No. 3,862,861 (McClelland et al.). The invention adapts well to rechargeable alkaline batteries as well. A spirally wound configuration is most preferred, utilizing thin plates 56, 58 and sandwiched separator 60 to provide high rate discharge capability. A method by which the cell may be wound is taught in U.S. Pat. No. 4,099,401 (Hug et al.).

The electrode plates of each cell are provided with groups of protruding collector tabs e.g., 62, 64, of opposite polarity. The respective cells are series connected by intercell connectors e.g., 66, 68, which are welded to the appropriate tab groupings of adjacent cells. These intercell connectors bridge over the top of the walls 25 and intercell partitions of container 12. Notches 70 in the walls of the cell holders, and the webs 46, 48, 50 of the container serve as recessed cavities for receiving such intercell connectors. These connectors may be provided with a shroud, sleeve or coating 72 or the like to prevent intercell creepage of electrolyte.

Terminal posts 74, 76 are respectively connected to output terminals 22, 24 using, for instance, the through-the-partition sealed connector shown more fully in U.S. Pat. No. 3,704,173 (McClelland et al.).

Inner top 14 is joined to the upper margin 78 of the monobloc container 12 by ultrasonic welding, bonding or the like to provide a gas and liquid-tight seal. The closure member 14 thereby seals off the mouth of the monobloc container and the only communication with the atmosphere is by release of internally generated gas through the actuation of Bunsen valve 80. This valve is preferably of the resealable safety type which opens at superatmospheric pressures above a predetermined pressure, e.g., 10–50 psig. All of the cells 28-1 . . . -6 in this embodiment intercommunicate with safety valve 80 through a common gas space or manifold 82, the advantages of which are described in commonly assigned U.S. application Ser. No. 221,226, filed on even date herewith.

The inner top 14 is also provided with a plurality of recessed spacer elements e.g., 84, 86 which substantially bear down upon the top of the wound elements (28-3, 28-4), preferably against a cushion provided by separator material 60 extending beyond the edges of the plates (see FIG. 5). The combination serves as a vibration absorber during use. The top is also provided with raised portions e.g., 88, 90 which provide clearance for the intercell connectors.

The battery housing may be provided with an outer top 16 attached in any desired manner to the inner top 14. In addition to serving a cosmetic purpose, it functions as an upper stop if and when Bunsen valve 80 releases excess pressure, protects the output terminals 22, 24 and also provides a means of mounting connector 26, FIG. 2, securely to the battery.

Figure 6:
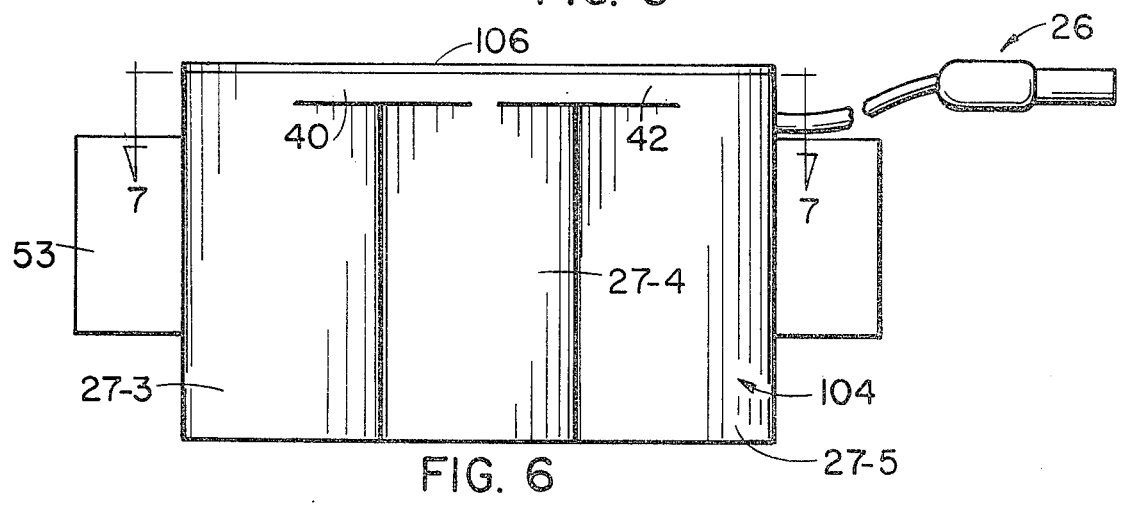
FIG. 6 is a side view of an alternative battery configuration of the invention.
Figure 7:
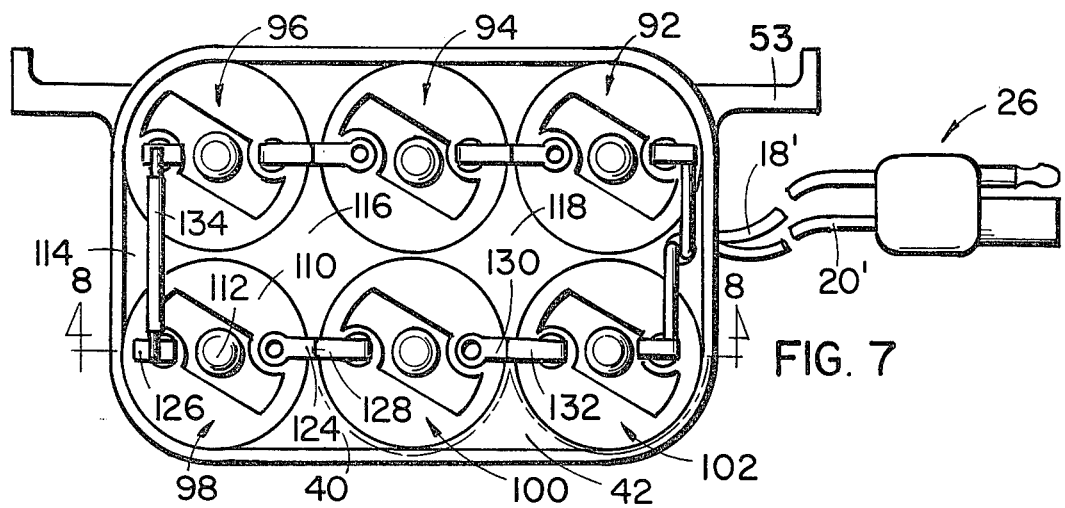
FIG. 7 is a top plan view taken along 7—7 of FIG. 6.
Figure 8:
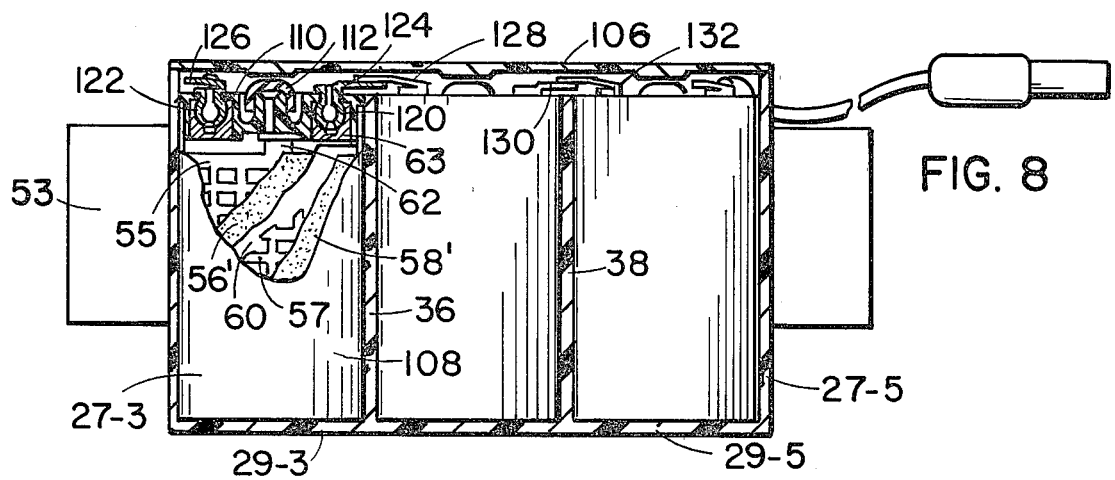
FIG. 8 is a partial cutaway, partial sectional view taken along 8—8 of FIG. 7.

The embodiment of FIGS. 6–8 differs from the previously described embodiment primarily by the fact that each of the six cells 92, 94, 96, 98, 100, 102 are individually sealed in gas and liquid tight fashion within their own containers.

The monobloc housing 104 for the battery of FIG. 6 is substantially identical with housing 12 of FIG. 1, particularly the bottom portion shown in section in FIG. 4. The upper portion at the mouth of the container 104 is modified somewhat to accommodate a different mode of interconnecting the cells. Thus, the stiffening web portions 114, 116, 118 etc., may be substantially planar and need not be recessed to accommodate the intercell connectors. In this embodiment the individual cells are wound into spiral elements, as shown in FIG. 4, however each element is encased in its own gas and liquid-tight plastic container (liner) composed of a cup-shaped portion 108, sealed by cover closure member 110, such as by ultrasonic welding. The sealed, wound elements per se are known (U.S. Pat. No. 3,862,861). To assist stuffing each encased cell in its cell holder, bottom portions 29-3, etc., may be perforated to allow air escape (not shown). Alternatively, liners 108 may be deleted and tops 110 sealed directly to the openings of each cell holder of the monobloc, in which case all the cup-shaped cell holders must have fully closed bottoms.

As shown in FIG. 8, the spiral elements include a positive plate (shown broken away to reveal the grid substrate component 55 onto which is applied the electrochemically active positive material 56') and a negative plate (employing grid 57 and active paste material 58'). Separator 60 is interleaved and compressed between the plate members in standard manner.

Tabs 62 emanating from one plate are attached to post members 63 and a sealed connection taken out through lid member 110 via externally expanded rivet member 120 and terminal tab 124. Similarly for the opposite polarity plate rivet member 122 and terminal tab 126 are brought through the lid.

The cells are oriented in monobloc 104 so that adjacent, opposite polarity tab pairs e.g., 124, 128 and 130, 132 are positioned immediately adjacent one another and across the substantially non-deformable intercell partitions 36, 38, respectively. In this manner, tab pairs e.g., 124, 128 are merely bent over together to make contact and welded, soldered or otherwise directly connected together. This provides a reliable, low impedance connection between the cells (except end cells 96–98) which, because of the rigid monobloc design and properties of the materials, resists vibrational forces i.e., the integrity of the weld is maintained. This becomes quite important in a lawn mower or other application characterized by considerable vibration in use.

Conductive leads 134, 18', and 20' are employed to complete continuity to terminal connector 26.

An advantage of employing separately sealed cells as in the FIGS. 6–8 embodiment, is the ability to replace weak or failed cells with fresh cells meeting performance specifications.

Only a single top closure member 106 need be employed, and this may be attached to the monobloc container 104 in any desired manner. Obviously, it is unnecessary to provide a seal between members 104 and 106, thus the members may be attached by bonding, press fitting together, snap fitting, or the like. In a battery comprised of individually sealed cells utilizing container (liner) 108, the underside of top 106 may also be provided with spacer elements (not shown) analogous to members 84, 86, which bear down on the tops 110, etc., of each cell to limit movement in the axial direction, for vibration resistance.

Figure 9:
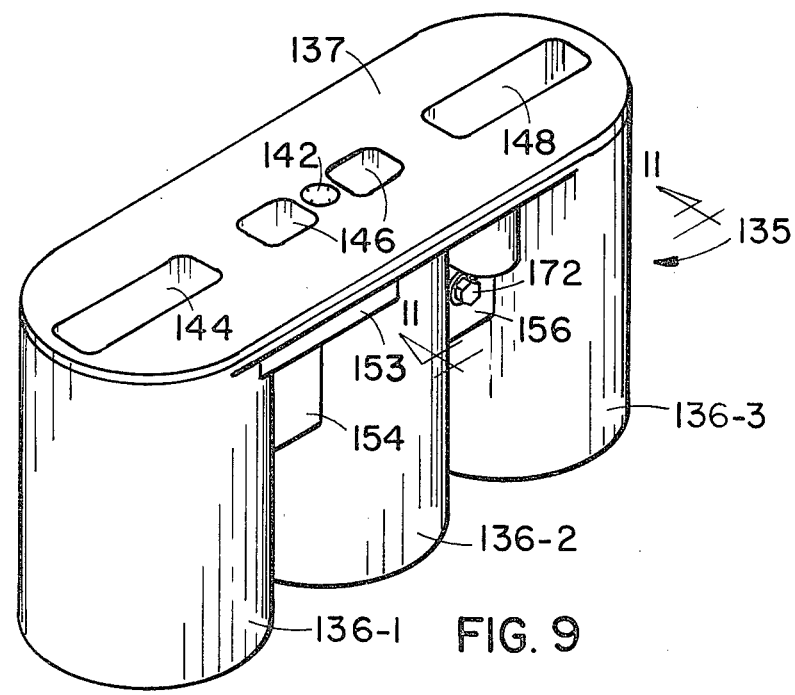
FIG. 9 depicts in perspective another alternative battery configuration in accordance with the invention.

In FIGS. 9–11 there is shown a further embodiment of the invention, a one-by-three cell configuration. In this embodiment the monobloc lower container 135 contains closed bottom cup-shaped cell holders 136-1, -2 and -3, interconnected at mutual intercell partitions 140, 141 at the tangent zones. Spirally wound cells, e.g., 138-3 similar to the embodiments of FIGS. 1–8 are snugly positioned within each of the cell holders. The three cells are all open to a common gas space which is closed by a resealable safety valve of the Bunsen or other type 142. Optionally, the approach used in the embodiment of FIGS. 6–8 may be employed wherein each cell is enclosed within its own sealed liner, and provided with its own safety valve.

The monobloc container 135, which is formed of a material which is substantially rigid is, at its mouth sealed to top closure member 137 to provide a gas and liquid tight battery. The top may be provided with recessed portions 144, 146, 148 which press down upon the top of each cell pack, between the welded tab connections 150, 152, etc., to provide vibration resistance.

As in the previous embodiments, the monobloc is provided with strengthening rib portions such as at 153, 154 and 156.

The cells are series connected by intercell connectors 158, 160 which bridge across the intercell partitions and over the top of the cell holders. The output terminals of the battery are brought out under lid 137 and nest in the nip area between adjoining cell holders 136-2, 136-3 for one terminal, and on the reverse side at 164 between cell holders 136-1 and 136-2. The terminals may be formed by employing the normal posts 166, 168, which have been turned over so that terminal receiving cavities 170 are facing downwardly into a resilient seat 172, formed integrally with monobloc housing 135. A terminal connection to the outside may then be established, such as by using an externally expanded rivet as in the previous embodiments, with the terminal tab e.g., 162 being brought out against the planar side of reinforcing rib 156. A standard lead 174 may then be attached under the screw connection for connection to the tab and held securely in place by screwing into strengthening rib 156. This provides an efficient, out-of-the-way connection for the battery, prevents accidental shorting, and allows for a low profile battery.

Clearly, other cell holder configurations may be used in accordance with the general teaching of the invention. For instance, rather than using the one-by-three configuration of FIG. 9, the three cells can be nested together as shown in FIG. 12. As shown, cell holders 176-1, 176-2, and 176-3 are formed of cup-shaped cylindrical cell holders which interconnect with each adjacent holder at the mutual circumferential tangent zones 178, 180, 182. In this embodiment as in the FIGS. 6–8 embodiment, the individual spirally wound cells, shown schematically, incorporate an inner plastic liner 184, etc., so that the individual cells may be sealed individually.

Another embodiment of the monobloc container, similar to FIG. 4, is shown in FIG. 13. In this embodiment the cell holders, 184-1, 184-2 . . . -6 nest together in a parallelogram envelope, with common intercell partitions defined at the mutual circumferential tangent zones, e.g., at 186, 188, 190. Various other configurations will be suggested to those skilled in the art.

While certain representative embodiments and details have been shown for the purpose of illustrating the invention, it will be apparent to those skilled in this art that various changes and modifications may be made therein without departing from the spirit or scope of the invention.

What is claimed is:

1. A multicell sealed rechargeable battery and housing therefor capable of withstanding variable internal pressures, comprising:
an open mouth substantially rigid monobloc container including a plurality of cup-shaped cell holders of internal substantially cylindrical shape each interconnected to at least one adjacent cell holder at mutual circumferential tangent zone(s), to define common substantially non-deformable intercell partitions at such zones;
non-self-contained electrochemical cells having plates and separator spirally wound together in substantially cylindrical shape closely fitting in said cell holders and electrically interconnected to form a battery; and
a closure member attached to the monobloc container at its mouth.

2. The battery of claim 1 wherein said cup-shaped cell holders as a unit form a corrugated outer surface serving as the outermost portion of the battery housing.

3. The battery of claim 1 provided with a single resealable safety valve integral with the closure member to release internal gas pressure above a predetermined superatmospheric pressure.

4. The battery of claim 1 wherein the cell holders have a substantially uniform wall gauge along their respective circumferences and have closed substantially planar bottoms.

5. The battery of claim 1 wherein the electrochemical cells and separators extend beyond edges of the plates to form a cushion and the closure member is provided with multiple recessed spacer elements which substantially bear down upon such cushion.

6. The battery of claim 1 wherein the monobloc container is provided with rigidifying webs which extend generally in a plane transverse to the axis of the cup-shaped cell holders, the webs forming recessed cavities housing the electrical interconnections.

7. The battery of claim 1 wherein the cells are fully interconnected together directly over the top of said nondeformable intercell partitions.

8. The battery of claim 1 wherein the electrochemical cells are sealed within individual cylindrical cell liners and tops, the cell liners fitting substantially snugly within the cup-shaped cell holders.

9. The battery of claim 8 wherein cell terminal tab members of adjacent cells are folded over together and joined electrically, to serve as the intercell connection.

10. A multicell sealed rechargeable battery and housing therefore capable of withstanding variable internal pressures, comprising:
a substantially open mouth rigid monobloc container comprised of a plurality of cylindrical cup-shaped cell holders each interconnected to at least one other cell holder at mutual circumferential tangent zone(s), to define common substantially nondeformable intercell partitions at such zones;
individually sealed electrochemical spirally wound cell pack elements contained within sealed plastic liners of substantially cylindrical shape closely fitting in said cell holders and electrically interconnected at the mouth opening of the monobloc with intercell connectors bridging over said intercell partitions; and each of said cell packs being sealed in gas and liquid tight manner within its own plastic liner and top, fitting snugly within the cell holders and opposite polarity terminals protruding out through said top, a portion of which terminals are bent over and interconnected directly with terminals of an adjacent cell;
a closure member attached to the monobloc container at its mouth.

11. The battery of claim 10 wherein each sealed cell is provided with resealable safety valve to release gas above a predetermined vent pressure.

12. The battery of claim 10 wherein output terminals for the battery are located in the nip area defined between adjacent cylindrical cell holder portions of the monobloc.

* * * * *

UNITED STATES PATENT OFFICE
CERTIFICATE OF CORRECTION

PATENT NO. : 4,346,151
DATED : Aug. 24, 1982
INVENTOR(S) : Toshio Uba, et al

It is certified that error appears in the above-identified patent and that said Letters Patent are hereby corrected as shown below:

Column 4, Line 65: "FIGS 1-8" should read --FIGS. 1-5 --:
Column 6, Line 21: delete "and" between "cells" and "separators".

Signed and Sealed this

Seventeenth Day of May 1983

[SEAL]

Attest:

DONALD J. QUIGG

Attesting Officer     Acting Commissioner of Patents and Trademarks